United States Patent [19]

Lewis et al.

[11] 4,264,322

[45] Apr. 28, 1981

[54] MULTICOLOR COATING SYSTEM

[75] Inventors: Richard H. Lewis, Charlotte, N.C.; Iris Holder, East Elmhurst, N.Y.; Michael L. Finney, Charlotte, N.C.

[73] Assignee: Celanese Corporation, New York, N.Y.

[21] Appl. No.: 73,411

[22] Filed: Sep. 7, 1979

[51] Int. Cl.$^2$ .................... D06P 1/00; C09B 67/00
[52] U.S. Cl. .......................... 8/479; 8/1XB; 8/15; 8/85 R; 8/89 R; 8/91; 8/92; 8/480; 8/582; 8/588; 8/592
[58] Field of Search .................... 8/14, 15, 91, 85 R, 8/89 R, 92

[56] References Cited

U.S. PATENT DOCUMENTS

| | | | |
|---|---|---|---|
| 3,393,411 | 7/1968 | McElveen | 8/14 |
| 3,468,694 | 9/1969 | Moritz et al. | 427/288 |
| 3,765,832 | 10/1973 | Shelso et al. | 8/91 |
| 4,010,709 | 3/1977 | Sayman et al. | 8/14 |
| 4,031,305 | 6/1977 | De Martino | 8/91 |
| 4,031,307 | 6/1977 | De Martino et al. | 536/120 |
| 4,073,653 | 2/1978 | Lindroth et al. | 8/91 |
| 4,131,422 | 12/1978 | Thomas et al. | 8/31 |
| 4,146,362 | 3/1979 | Nichols | 8/14 |

*Primary Examiner*—A. Lionel Clingman
*Attorney, Agent, or Firm*—Herbert P. Price; K. A. Genoni; T. J. Morgan

[57] ABSTRACT

This invention provides an aqueous gel composition which is adapted for application on the surface of articles to achieve a sharply defined multicolor pattern effect.

The aqueous gel composition consists of an aqueous gel matrix which has dispersed therein one or more immiscible colorant gel phases.

33 Claims, No Drawings

MULTICOLOR COATING SYSTEM

BACKGROUND OF THE INVENTION

The present invention relates to compositions and processes for applying random and non-random multicolor patterns on a variety of flat and irregular surfaces such as are represented by woven and non-woven textile materials, paper products, wood and metal articles, and the like. The following disclosure is described more specifically with respect to the dyeing of carpets and other textile materials.

The application of multicolor effects on textile materials is an important aspect of textile styling techniques. Among the known methods of achieving multicolor effects on textile materials are those involving direct printing, resist printing and discharge printing procedures.

In a direct printing method, one or more flexible dyestuff pastes are printed on flat textiles. In a discharge printing method, dyestuff pastes containing reducing or oxidizing agents are applied to pre-dyed textile material. The bottom dyeing is destroyed with a subsequent thermal treatment. Color effects are obtained when the printing pastes also contain fixable dyestuffs which are resistant to the discharge agents. In a resist printing method, the fixation of a pre-padded or cross-padded dyestuff is prevented by printing resist agents which function by means of a chemical or mechanical action. The color effects are obtained by including dyestuffs which are fixable in the presence of a resist agent.

Other known methods for producing multicolor effects include those involving dropwise application of dye solutions, and application by means of spraying, foaming, and the like, followed by a thermal fixation step. Such methods have particular application for obtaining randomly distributed multicolor effects in the dyeing of pile-fiber textiles such as carpets.

There are several disadvantages characteristic of the known methods of achieving sharply defined multicolor print effects or patterns of randomly dispersed dyestuffs. Uncontrolled colorant migration and blending causes variations in shading which detract from the appearance of the textile material. Further, the migration of colorant serves to limit the range of multicolor effects which can be achieved, and concomitantly there is a low color yield and an increased requirement of expensive dyestuffs.

One of the means developed to reduce the colorant migration problem is the incorporation of an antimigration agent in a dyestuff solution. Among the antimigrating agents known in the prior art are natural gums; poly(vinyl methyl ether/maleic anhydride) derivatives as disclosed in U.S. Pat. No. 3,957,427; melamine formaldehyde and urea formaldehyde resins as disclosed in U.S. Pat. No. 4,132,522; Kelgin RL (Kelco Co.); Superclear 100N (Diamond Shamrock); and the like.

The use of antimigration agents has found restricted application in the textile dyeing industry. Some agents merely increase the viscosity of a colorant medium without controlling dyestuff migration significantly. Other agents tend to coagulate dyestuff values and reduce color yield. Also, the selection of the quantity of antimigration agent to be employed can be critical, and consequently the control of colorant medium viscosity is difficult.

Accordingly, it is a main object of this invention to provide a process for achieving attractive multicolor effects on textile materials with improved sharpness, uniformity and color yield.

It is another object of this invention to provide an improved process for applying sharply delineated color patterns on flat or textured or fiber-pile textile materials substantially without dyestuff migration.

It is a further object of this invention to provide an aqueous colorant vehicle adapted for applying a multicolor coating on the surface of textile, paper, wood, plastic, metal, glass, and similar substrate materials.

Other objects and advantages of the present invention shall become apparent from the accompanying description and examples.

DESCRIPTION OF THE INVENTION

One or more objects of the present invention are accomplished by the provision of an aqueous gel composition adapted for the application of a color effect on a surface which consists of an admixture of immiscible gel phases comprising a major quantity of (1) a first aqueous gel phase which is thickened with a cationic gelling agent, and which has dispersed therein a minor quantity of (2) a second aqueous gel phase which is thickened with an anionic gelling agent, and which contains a colorant component.

In another embodiment, this invention provides a process for producing an aqueous gel composition comprising an admixture of immiscible gel phases which is adapted for the application of a color effect on the surface of an article, which process comprises (1) preparing a major quantity of a first aqueous gel phase matrix which is thickened with a cationic gelling agent; and (2) dispersing in the first gel phase matrix a minor quantity of a second aqueous gel phase which is thickened with an anionic gelling agent, and which contains a colorant component.

In a further embodiment, this invention provides an article having applied on its surface an aqueous gel composition in the form of a multicolor pattern, wherein the gel composition comprises a partitioned admixture of immiscible gel phases comprising a major quantity of (1) a first aqueous gel phase which is thickened with a cationic gelling agent, and which has dispersed therein a minor quantity of (2) a second aqueous gel phase which is thickened with an anionic gelling agent, and which contains a colorant component.

The first aqueous gel phase (i.e., the matrix phase) is present in the composition in a quantity between about 60–95 weight percent, and preferably in a quantity between about 65–90 weight percent, based on total composition weight. The second aqueous gel phase (i.e., the dispersed phase) is present in the composition in a quantity between about 5–40 weight percent, and preferably in a quantity between about 10–35 weight percent, based on total composition weight.

It is an important aspect of the present invention that two or more immiscible gel phases of the above-described second type can be dispersed in the matrix phase, wherein each of the said dispersed gel phases contains a different colorant so as to provide an aqueous gel vehicle which is characterized by a random distribution of colorant entities. The weight of the two or more dispersed gel phases can total up to about 40 weight percent of the composition.

It is another aspect of this invention that the matrix gel phase can also contain a colorant component, preferably a dyestuff which is soluble in the matrix gel medium.

It is a further aspect of this invention that the matrix gel phase can contain an anionic gelling agent, instead of a cationic gelling agent; and concomitantly, the dispersed gel phase must then contain a cationic gelling agent, instead of an anionic gelling agent.

The quantity of cationic or anionic gelling agent incorporated in any one of the aqueous matrix or dispersed gel phases will vary in the range between about 0.05–3 weight percent, and preferably will average in the range between about 0.1–2 weight percent, based on the weight of the individual gel phases.

By the term "gelling agent" as employed herein is meant a natural or synthetic hydrocolloid which is water-soluble or water-hydratable or water-dispersable, the presence of which in an aqueous medium increases the viscosity of the said aqueous medium up to and including a state of gelation.

Illustrative of hydrocolloid cationic gelling agents suitable for the practice of the present invention include hydratable natural and synthetic polymers which contain a multiplicity of quaternary ammonium groups. Typical of quaternary ammonium groups are tetramethylammonium chloride and bromide, benzyltrimethylammonium chloride and bromide, tetraethylammonium chloride and bromide, tetrabutylammonium chloride and bromide, methylpyridinium chloride and bromide, benzylpyridinium chloride and bromide, trimethyl-p-chlorobenzylammonium chloride and bromide, triethanolmethylammonium chloride and bromide, and the like, wherein each of the said groups is derivatized in the form of a radical which is substituted in a hydrocolloid gelling agent by means of an alkylene or oxyalkylene linkage.

Other hydrocolloids can be employed which contain cationic groups such as acid salts of primary, secondary and tertiary amines, or which contain phosphonium or sulfonium groups. The anion moiety associated with a cationic group include halide, sulfate, sulfonate, hydroxide, and the like.

The polymeric structure of suitable hydrocolloid cationic gelling agents include vinyl polymer and copolymers, ion exchange resins, polysaccharides, and the like. A particularly preferred class of hydrocolloids are derivatized natural gums which contain the appropriate cationic groups. Illustrative of this class of hydrocolloids are polygalactomannan gums containing quaternary ammonium ether substituents as described in U.S. Pat. No. 4,031,307:

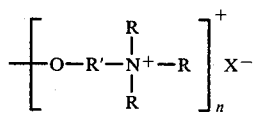

wherein R is an alkyl group containing between one and about six carbon atoms, R' is an alkylene group containing between one and about six carbon atoms, X is chlorine or bromine, and n is an integer which correlates with the degree of substitution of the quaternary ammonium ether substituents in a polygalactomannan gum cationic gelling agent. The said alkyl and alkylene group can contain other atoms such as oxygen, sulfur and halogen.

The degree of substitution will vary in the range between about 0.01–3. By the term "degree of substitution" as employed herein is meant the average substitution of ether groups per anhydro sugar unit in the polygalactomannan gums. In guar gum, the basic unit of the polymer consists of two mannose units with a glycosidic linkage and a galactose unit attached to a hydroxyl group of one of the mannose units. On the average, each of the anhydro sugar units contains three available hydroxyl sites. A degree of substitution of one means that one third of the available hydroxy sites have been substituted with ether groups.

Polygalactomannan gums are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1–6 linkage on alternate mannose units. The ratio of galactose to mannose in the guar polymer is, therefore, one to two. Guar gum has a molecular weight of about 220,000.

Locust bean gum is also a polygalactomannan gum of similar molecular structure in which the ratio of galactose to mannose is one to four. Guar and locust bean gum are the preferred sources of the polygalactomannans, principally because of the commercial availability thereof.

Polygalactomannan gums swell readily in cold water and can be dissolved in hot water to yield solutions which characteristically have a high viscosity even at a concentration of 1–1.5 percent. Guar gum and locust bean gum as supplied commercially usually have a viscosity (at 1% concentration) of around 1000 to 4000 centipoises at 25° C. using a Brookfield Viscometer Model LVF, spindle No. 2 at 6 rpm.

Also suitable are polygalactomannan gums which have been derivatized by substitution of hydroxyl groups by other ether groups, in addition to the quaternary ammonium-containing ether groups. Generally the preferred polygalactomannan ether derivatives are those which have a degree of substitution up to about 1.5.

The anionic gelling agent component of the present invention aqueous gel compositions are hydrocolloids which have the same type of basic polymeric structure as disclosed above in the description of the cationic gelling agents, except that in place of a cationic group there is substituted an anionic group such as carboxylic acid, sulfonic acid, sulfate, and the like. Preferred anionic gelling agents include polysaccharides containing carboxyalkyl groups; synthetic polymers and copolymers containing acrylic acid, maleic acid or benzenesulfonic acid groups; and the like.

The colorants contemplated to be employed in the present invention aqueous gel compositions include the conventional anionic dyes, nonionic dyes and cationic dyes, alone or in combination with other colorants such as pigments, powdered metals, and the like. A colorant component is present in an immiscible aqueous gel phase in quantity which can vary from a trace amount up to about 5 weight percent or more. The average quantity of colorant in an aqueous gel phase will vary in the range between about 0.1–5 weight percent, based on the weight of aqueous gel phase. A dye colorant normally will be dissolved in the aqueous gel phase, while pigments, powdered metals, and the like, are present in the form of a suspension.

Illustrative of a preferred class of colorants are disperse dyes such as are listed under the heading "Disperse Dyes" in Colour Index, 3rd Edition, Volumes 2-3, published by The American Association Of Textile Chemists and Colorists.

A particularly preferred class of dyestuffs for the practice of the present invention are those identified as acid dyes. A list of commercially available acid dyes is provided in Textile Chemists and Colorists (volume 8, No. 7A, pages 73-78, July 1976), a periodical published by The American Association of Textile Chemists and Colorists.

In general, it is advantageous to employ an anionic dye in an aqueous gel phase which is thickened with an anionic gelling agent, and to employ a cationic dye in an aqueous gel phase which is thickened with a cationic gelling agent.

The method in which a minor quantity of aqueous gel phase is dispersed in a major quantity of matrix aqueous gel phase determines the resultant colorant pattern in the admixture of immiscible gel phases.

Thus, a swirl or marble effect is achieved by dispersing an aqueous gel colorant phase in a matrix phase with low energy stirring so that the dispersion is not segmented.

A distribution of large specks is achieved by dispersing an aqueous gel colorant phase in a matrix phase with medium energy stirring so that the dispersion is segmented into discrete large-size specks.

A distribution of fine specks (e.g., a heather effect) is achieved by dispersing an aqueous gel colorant phase in a matrix phase with high energy stirring so that the dispersion is segmented into discrete small-size specks.

As indicated previously, the present invention aqueous gel compositions are adapted for achieving multicolor pattern effects on rigid or non-rigid surfaces employing conventional printing and coating application techniques and equipment. The present invention has particular advantage when it is contemplated for the application of multicolor effects on textile materials, wherein the textile material is dye treated in a continuous assembly such as a commercial Kuester-Tak apparatus. Suitable means and equipment of the Kuester-Tak type for dye treating a moving web of textile material are described in U.S. Pat. Nos. 3,541,815, 3,718,427, 4,146,362, and references cited therein, incorporated herein by reference.

The present invention has special advantage for achieving marble, speckled and resist effects, which effects are desirable for multicolor styling of textile materials. The invention aqueous gel systems provide color patterns which have a unique combination of sharpness, uniformity, and color yield. The multicolor pattern can be applied to essentially any surface which is amenable to conventional coating techniques such as screen printing, doctoring, cascading, padding, and the like.

In the case of disperse dyes and acid dyes, and the like, thermal fixation of an applied multicolor pattern on a textile material is readily accomplished by steam-aging or dry-heat, followed by conventional washing and drying procedures. For example, a dye treated carpet can be steam-aged for 10 minutes at 215° F., washed with cold water, and then dried.

The following examples are further illustrative of the present invention. The components and other specific ingredients are presented as being typical, and various modifications can be derived in view of the foregoing disclosure within the scope of the invention.

EXAMPLE I

This Example illustrates the preparation and application of a present invention aqueous gel composition to produce a multicolor pattern on a textile material.

A gel solution is prepared by admixing 8 grams/liter of hydrocolloid cation gelling agent (Jaguar C-13, Celanese; reaction product of 2,3-epoxypropyltrimethylammonium chloride with guar gum) with water, and adding a quantity of acetic acid which is about 4 weight percent, based on the weight of gelling agent. The admixture is stirred at room temperature until hydration of the gelling agent is completed.

The solution viscosity is 1800 CPS, as measured on a Brookfield LVF at 60 rpm with a #4 spindle. The pH of the solution is 6.1.

A second gel solution is prepared which has the following composition and properties:

| Grams/liter | |
|---|---|
| 0.8 | Acidol Brown M-BL (BASF) |
| 10.0 | Celca-Print 80 (Celanese)[1] |
| 989.2 | Water |
| Viscosity | 175 cps |
| pH | 8.4 |

[1] A high solids emulsion based on a mixture of carboxypolymethylene in water and mineral spirits stabilized with surfactants.

A third gel solution is prepared which has the following composition and properties:

| Grams/liter | |
|---|---|
| 0.8 | Yellow NW 250% (Verona) |
| 12.0 | Celca-Print 80 (Celanese) |
| 987.2 | Water |
| Viscosity | 450 cps |
| pH | 8.3 |

An admixture of immiscible gel phases is prepared by pouring through a funnel a 5 liter volume of the first gel solution, simultaneously with a 300 gram quantity of each of the second and third gel solutions, respectively. The resultant aqueous gel composition consists of a matrix of the first gel solution in which there is dispersed a varigated swirl pattern of immiscible second and third gel solutions.

A carpet sample is pre-wet with an aqueous solution (3 grams/liter of Pomoco-JW, Piedmont Chemicals). The carpet is then coated with the aqueous gel composition, and steam-aged for about ten minutes to fix the dyes. The color effect of the dye treatment on the carpet surface is in the form of a random pattern of yellow and brown swirls.

EXAMPLE II

In a manner similar to the first Example, a first gel solution is prepared which is an aqueous medium containing 1.25 weight percent of a hydrocolloid cation gelling agent (hydroxypropyltrimethylammonium chloride ether of guar gum) and 5 weight percent acetic acid. After standing overnight, the gel solution has a viscosity of 7000-8000 cps and a pH of 6-6.5.

Three different base color gel solutions are prepared:
Base Black 3.0% Palacet Black Z PAT liq. (BASF)
97.0% Celca-Print 80 (Celanese), 2.5% solution
Viscosity 3050 cps
pH 8.7
Base Brown
  3.0% Palanil Brown 3 REL liq. (BASF)
  97.0% Celca-Print 80 (Celanese), 2.5% solution
  Viscosity 1850 cps
  pH 8.9
Base Grey
  0.3% Palacet Black Z PAT liq. (BASF)
  99.7% Celca-Print 80 (Celanese), 2.5% solution
  Viscosity 5400 cps
  pH 8.9

The following procedure is employed to produce an aqueous gel composition which consists of a matrix of the first gel solution which has the three immiscible base color gel phases dispersed therein as discrete specks:
7200 grams—first gel solution
400 grams—Base Grey solution
320 grams—Base Brown solution
80 grams—Base Black solution The first gel solution (i.e., the matrix phase) is placed in a container and stirred at medium speed with an Eppenback stirrer. In turn, each base color solution is added and allowed to separate and disperse as specks. The total stirring time is 8 minutes. The resultant substantially homogeneous composition of immiscible aqueous gel phases has a viscosity of 2700 cps and a pH of 6.4.

The aqueous gel composition is employed to dye a 10 yard piece of polyester knit material by screen printing. A ⅝" print rod is employed, and the print speed is approximately 5.5 yards per minute.

The printed textile material is thermofixed for 8 minutes at 350° F. to develop the multicolor pattern of grey, brown and black specks which appear to be uniformly distributed on the textile surface.

EXAMPLE III

This Example illustrates the application of multicolor speckled patterns on a variety of textile materials employing various printing techniques.

In the manner of the previous Examples, a matrix gel solution is prepared by blending water and 9 grams/liter of hydrocolloid cation gelling agent (e.g., Jaguar C-13, Celanese) and 0.4 gram/liter of acetic acid. The resultant gel solution has a viscosity of 1500 cps and pH of 4.0.

The following solutions are prepared:

| | Dye Solutions | |
|---|---|---|
| Red | Blue | |
| 15 grams/liter | — | Erionyl Red 13B (Ciba-Geigy) |
| — | 10 grams/liter | Erionyl Blue P2R (Ciba-Geigy) |
| 24 grams/liter | 24 grams/liter | Celca-Print 80 (Celanese) |
| 93 cps | 165 cps | Viscosity |
| | Pad Solution | |
| Grams/liter | | |
| 2 | | Erionyl Yellow 4R 250% (Ciba-Geigy) |
| 3 | | Guar gum |
| 3 | | Progalan OGN (Chemical Processing of Ga.) |
| 5 | | Citric acid |
| Viscosity | 50 cps | |
| pH | 2.5 | |

An aqueous gel composition of immiscible gel phases is prepared by stirring and dispersing into the matrix solution 20 milliliters/liter of red solution and 15 milliliters/liter of blue solution. A high speed stirring action is employed, which causes the immiscible color phases to be distributed as fine specks. A second aqueous gel composition is prepared in the same manner, except that medium speed stirring is employed. Larger specks are achieved by the slower stirring action.

The fine-speck solution is printed through a 40 mesh screen onto level loop carpet and cut pile carpet, and the multicolor dye patterns are thermofixed.

The large-speck solution is doctored onto the same types of carpet. The solution is also employed to space print (e.g., engraved rolls and raised rubber rolls) onto sock material.

In the above-described printing operations, in some cases the textile material is pretreated with the pad solution. In all cases the multicolor patterns on the textile materials are subjected to thermofixing.

What is claimed is:

1. An aqueous gel composition adapted for the application of a color effect on a surface which consists of an admixture of immiscible gel phases comprising a major quantity of (1) a first aqueous gel phase which is thickened with a cationic gelling agent, and which has dispersed therein a minor quantity of (2) a second aqueous gel phase which is thickened with an anionic gelling agent, and which contains a colorant component.

2. An aqueous gel composition in accordance with claim 1 wherein the first gel phase is present in a quantity between about 60–95 weight percent, and the second gel phase is present in a quantity between about 5–40 weight percent, based on total composition weight.

3. An aqueous gel composition in accordance with claim 1 wherein the cationic gelling agent in the first gel phase is a hydrocolloid which contains quaternary ammonium substituents.

4. An aqueous gel composition in accordance with claim 1 wherein the cationic gelling agent in the first gel phase is a polygalactomannan gum which contains quaternary ammonium substituents.

5. An aqueous gel composition in accordance with claim 1 wherein the first gel phase contains a colorant component.

6. An aqueous gel composition in accordance with claim 1 wherein the anionic gelling agent in the second gel phase is a hydrocolloid which contains carboxylic acid or sulfonic acid groups.

7. An aqueous gel composition in accordance with claim 1 wherein the anionic gelling agent in the second gel phase is a water-hydratable synthetic resin which contains carboxylic acid or sulfonic acid groups.

8. An aqueous gel composition in accordance with claim 1 wherein the colorant component in the second gel phase is an anionic dye.

9. An aqueous gel composition in accordance with claim 1 wherein the first gel phase matrix has dispersed therein minor quantities of at least two immiscible gel phases of the second type, each of which contains a different colorant component.

10. An aqueous gel composition adapted for the application of a color effect on a surface which consists of an admixture of immiscible gel phases comprising a major quantity of (1) a first aqueous gel phase which is thickened with an anionic gelling agent, and which has dispersed therein a minor quantity of (2) a second aqueous gel phase which is thickened with a cationic gelling agent, and which contains a colorant component.

11. An aqueous gel composition in accordance with claim 10 wherein the colorant component in the second gel phase is a cationic dye.

12. An aqueous gel composition in accordance with claim 1 wherein the second gel phase is dispersed in the first gel phase matrix in the form of a random distribution of specks.

13. An aqueous gel composition in accordance with claim 1 wherein the second gel phase is dispersed in the first gel phase matrix in the form of a random distribution of swirls.

14. A process for producing an aqueous gel composition comprising an admixture of immiscible gel phases which is adapted for the application of a color effect on the surface of an article, which process comprises (1) preparing a major quantity of a first aqueous gel phase matrix which is thickened with a cationic gelling agent; and (2) dispersing in the first gel phase matrix a minor quantity of a second aqueous gel phase which is thickened with an anionic gelling agent, and which contains a colorant component.

15. A process in accordance with claim 14 wherein minor quantities of at least two different immiscible gel phases of the second type are dispersed in the major quantity of first gel phase matrix.

16. A process in accordance with claim 14 wherein the minor quantity of second gel phase is dispersed in the first gel phase matrix in the form of specks.

17. A process in accordance with claim 14 wherein the minor quantity of second gel phase is dispersed in the first gel phase matrix in the form of swirls.

18. A process in accordance with claim 14 wherein the first gel phase matrix contains a colorant component.

19. A process for producing an aqueous gel composition comprising an admixture of immiscible gel phases which is adapted for the application of a color effect on the surface of an article, which process comprises (1) preparing a major quantity of a first aqueous gel phase matrix which is thickened with an anionic gelling agent; and (2) dispersing in the first gel phase matrix a minor quantity of a second aqueous gel phase which is thickened with a cationic gelling agent, and which contains a colorant component.

20. A process in accordance with claim 19 wherein minor quantities of at least two different immiscible gel phases of the second type are dispersed in the major quantity of the first gel phase matrix.

21. A process in accordance with claim 19 wherein the minor quantity of second gel phase is dispersed in the first gel phase matrix in the form of specks.

22. A process in accordance with claim 19 wherein the minor quantity of second gel phase is dispersed in the first gel phase matrix in the form of swirls.

23. A process in accordance with claim 19 wherein the first gel phase matrix contains a colorant component.

24. An article having applied on its surface an aqueous gel composition in the form of a multicolor pattern, wherein the gel composition comprises a partitioned admixture of immiscible gel phases comprising a major quantity of (1) a first aqueous gel phase which is thickened with a cationic gelling agent, and which has dispersed therein a minor quantity of (2) a second aqueous gel phase which is thickened with an anionic gelling agent, and which contains a colorant component.

25. An article in accordance with claim 24 wherein all colorant components in the multicolor pattern are anionic dyes.

26. An article in accordance with claim 24 wherein the article is a textile material.

27. An article in accordance with claim 26 wherein the multicolor pattern is fixed to the textile material.

28. A process for achieving a multicolor pattern on a surface which comprises applying to the surface an aqueous gel composition which consists of a partitioned admixture of immiscible gel phases comprising a major quantity of (1) a first aqueous gel phase which is thickened with a cationic gelling agent, and which has dispersed therein a minor quantity of (2) a second aqueous gel phase which is thickened with an anionic gelling agent, and which contains a colorant component.

29. A process in accordance with claim 28 wherein the multicolor pattern is fixed to the surface in a subsequent step.

30. A process in accordance with claim 28 wherein the multicolor pattern is in the form of a random distribution of specks.

31. A process in accordance with claim 28 wherein the multicolor pattern is in the form of a random distribution of swirls.

32. A process in accordance with claim 28 wherein the first gel phase matrix contains a colorant component.

33. A process in accordance with claim 28 wherein minor quantities of at least two different immiscible gel phases of the second type are dispersed in the major quantity of the first gel phase matrix.

* * * * *